UNITED STATES PATENT OFFICE.

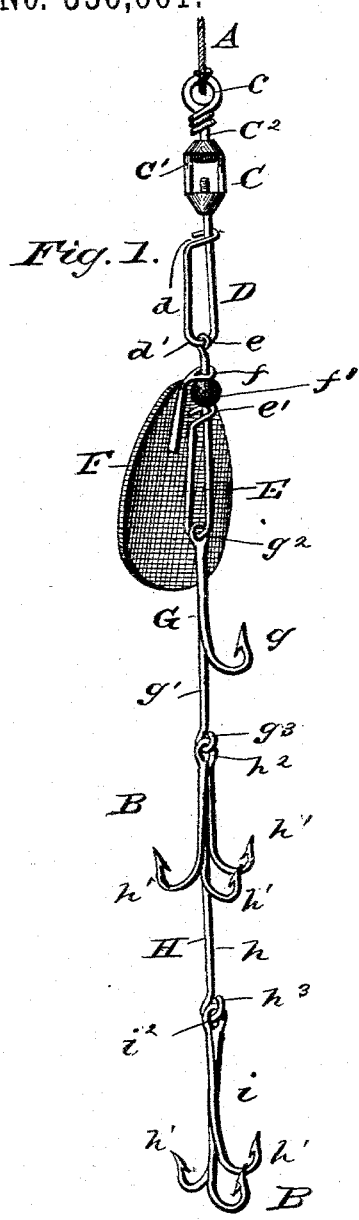
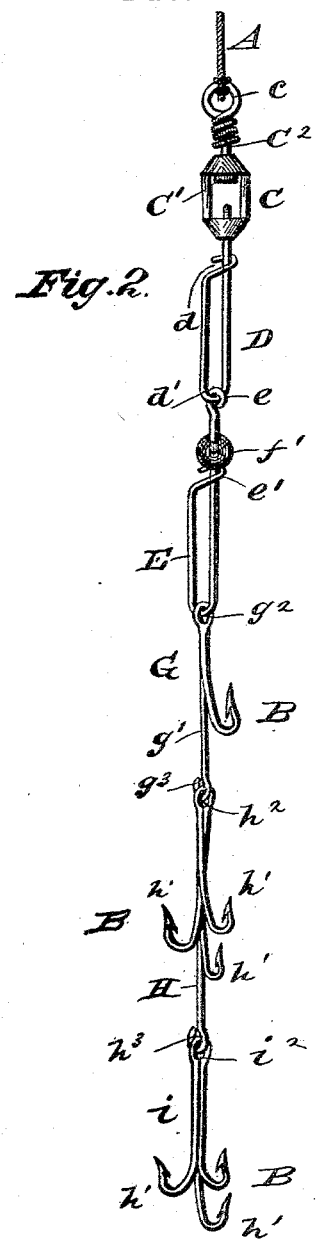

ADAM PFAFF, OF WAYLAND, NEW YORK.

GANG FISH-HOOK.

SPECIFICATION forming part of Letters Patent No. 356,661, dated January 25, 1887.

Application filed April 23, 1886. Serial No. 199,946. (No model.)

*To all whom it may concern:*

Be it known that I, ADAM PFAFF, of Wayland, in the county of Steuben and State of New York, have invented certain new and useful Improvements in Gang Fish-Hooks; and I do hereby declare that the following is a full, clear, and exact description thereof, reference being had to the accompanying drawings, and to the letters of reference marked thereon, which form part of this specification, in which—

Figure 1 represents the gang of hooks having the spoon-bearing detachable link connected thereto. Fig. 2 is a view of the hook-gang without the spoon-bearing link.

This invention relates to fishing-hooks arranged in gangs, its main object being to connect the hooks to the gang in such manner that they may be readily attached thereto or detached therefrom when desired or necessary.

A further object is to connect the members of a gang by such joints that a hook to which a fish is hung will have free lateral play on the gang and the fish will not be liable to tear away and escape.

The invention consists in the construction and novel arrangement of parts hereinafter described, and pointed out in the appended claim.

Referring to the accompanying drawings by letter, A designates a fishing-line, and B a gang of hooks attached thereto.

C is a swivel-joint, composed of the small block C' and the stem $C^2$, having one end pivoted in the end of said block and the other end formed into a loop or eye, $c$, to which the line A is secured.

D is a link, composed of steel wire, having one end secured to the end of the block C' opposite the stem $C^2$ and bent upon itself, its free end being formed into a lateral hook, $d$, adapted to engage and hold on the shank of the link.

By reference to Figs. 1 and 2 it will be seen that the straight end of the link D is screw-threaded through the lower end of the swivel C. I am thus able to readily detach the link D from the swivel when desired, and to shorten or lengthen the distance between upper end of the spoon F and said swivel or line A.

E is a link similar to the link D, but having the upper end of the wire of which it is composed formed into an eye, $e$, adapted to engage the bend $d'$ of the link D and be readily disengaged therefrom.

$e'$ is the lateral hook on the bent end of the link E, adapted to engage and hold on the shank thereof.

F is a hanging spoon or spinner provided at its end with the eyed link $f$, sliding and turning freely on the shank of the link E.

$f'$ is a bead bored diametrically and turning on the shank of the link E above the hook $e'$. The eyed link $f$ on the spoon rests upon the upper side of the bead $f'$, which enables the spoon to turn without binding on the link E.

G is the upper link or member of the gang of hooks B, which link is composed of the single hook $g$ and steel-wire rod $g'$, to which the back of the hook is rigidly secured by solder or in other proper manner. The rod $g$ is provided with the eyes $g^2$ and $g^3$, respectively, at its upper and lower ends, the upper eye being adapted to engage the bend of either link D or E and be detached therefrom when necessary, and the lower eye similarly engaging an eye on the second link or member of the gang, as hereinafter explained.

H is the second link or member of the gang, composed of the steel-wire rod $h$ and one or any desired number of hooks, $h'$, rigidly secured thereto by their backs, as shown. The rod $h$ has the upper eye, $h^2$, which detachably engages the eye $g^3$ of the first link, and the lower eye, $h^3$, which similarly engages the upper eye, $i^2$, of the steel-wire rod $i$, composing part of the third link or member of the gang.

It is evident that any desired number of links or members can be thus attached to the gang B, the lowest or last member having only one eye, as shown in the drawings.

The link E, carrying the swinging spoon F, can be readily detached from the gang, when desired and the hooks connected with the link D, if no spoon or spinner is necessary, or a link similar to E, with a spoon of any desired form or color, may be substituted therefor.

The gang may, as is evident, be lengthened or shortened, as desired, by adding or taking away links, and in still fishing the spoon and lower links may be removed from the gang, leaving only a single hook.

In using the full gang with the spoon, should a fish be hooked on any link the lateral play between the links will prevent his tearing away from the hook and escaping as easily as in a gang composed of members rigidly secured together.

I am aware that gangs of hooks provided with a spoon or spinner and swiveled to the fishing-line have been long used, and I do not claim such construction, broadly.

The loop-links D and E are both spring-loop links, and can be easily sprung into and out of place, their hooks $d$ and $e'$ engaging their respective shanks to keep them safely in place.

Having described my invention, I claim—

The combination of a swivel having an attaching-eye for the line, a safety-hook having its shank screwed into the base of the swivel, a second safety-hook having an eye on its shank linked to the said safety-hook and detachable therefrom, a bead and spoon between the hooked attachment of the lower safety-hook and the link of the upper safety-hook, and a shank bearing a hook and two eyes attached to the lower safety-hook, all constructed and adapted to operate substantially in the manner and for the purposes specified.

In testimony that I claim the foregoing as my own I affix my signature in presence of two witnesses.

ADAM PFAFF.

Witnesses:
PHILIP ZEIGLEY,
HERMAN J. WERDEIN.